(12) United States Patent
Natarajan et al.

(10) Patent No.: US 8,661,499 B2
(45) Date of Patent: Feb. 25, 2014

(54) DYNAMIC POLICY TREES FOR MATCHING POLICIES

(75) Inventors: Ramesh Natarajan, Northborough, MA (US); Timothy G. Brown, Fort Edward, NY (US)

(73) Assignee: CA, Inc., Islandia, NY (US)

( * ) Notice: Subject to any disclaimer, the term of this patent is extended or adjusted under 35 U.S.C. 154(b) by 321 days.

(21) Appl. No.: 12/831,475

(22) Filed: Jul. 7, 2010

(65) Prior Publication Data
US 2012/0011560 A1 Jan. 12, 2012

(51) Int. Cl.
*G06F 17/00* (2006.01)
*G06F 11/00* (2006.01)

(52) U.S. Cl.
USPC .................................. 726/1; 726/11

(58) Field of Classification Search
USPC ....................................... 726/1, 22
See application file for complete search history.

(56) References Cited

U.S. PATENT DOCUMENTS

| | | | | |
|---|---|---|---|---|
| 6,779,120 B1* | 8/2004 | Valente et al. | ...... | 726/1 |
| 7,478,419 B2* | 1/2009 | Anderson et al. | ...... | 726/1 |
| 7,565,683 B1* | 7/2009 | Huang et al. | ...... | 726/1 |
| 2003/0115484 A1* | 6/2003 | Moriconi et al. | ...... | 713/201 |
| 2003/0154404 A1* | 8/2003 | Beadles et al. | ...... | 713/201 |
| 2003/0187817 A1* | 10/2003 | Agrawal et al. | ...... | 707/1 |
| 2004/0215650 A1* | 10/2004 | Shaji et al. | ...... | 707/102 |
| 2006/0048209 A1* | 3/2006 | Shelest et al. | ...... | 726/1 |
| 2006/0167858 A1* | 7/2006 | Dennis et al. | ...... | 707/3 |
| 2008/0066147 A1* | 3/2008 | Dillaway et al. | ...... | 726/1 |
| 2008/0066150 A1* | 3/2008 | Lim | ...... | 726/1 |
| 2008/0184336 A1* | 7/2008 | Sarukkai et al. | ...... | 726/1 |
| 2008/0320549 A1* | 12/2008 | Bertino et al. | ...... | 726/1 |
| 2009/0222884 A1* | 9/2009 | Shaji et al. | ...... | 726/1 |
| 2009/0300711 A1* | 12/2009 | Tokutani et al. | ...... | 726/1 |
| 2010/0235879 A1* | 9/2010 | Burnside et al. | ...... | 726/1 |
| 2010/0269148 A1* | 10/2010 | Almeida et al. | ...... | 726/1 |
| 2011/0246498 A1* | 10/2011 | Forster | ...... | 707/769 |

* cited by examiner

*Primary Examiner* — Techane Gergiso
(74) *Attorney, Agent, or Firm* — Myers Bigel Sibley & Sajovec

(57) ABSTRACT

A system and method is provided for evaluating one or more security policies. Security policies may be analyzed to determine one or more policy attributes based on which one or more policy trees should be generated. These policy trees may be utilized for evaluation purposes.

15 Claims, 2 Drawing Sheets

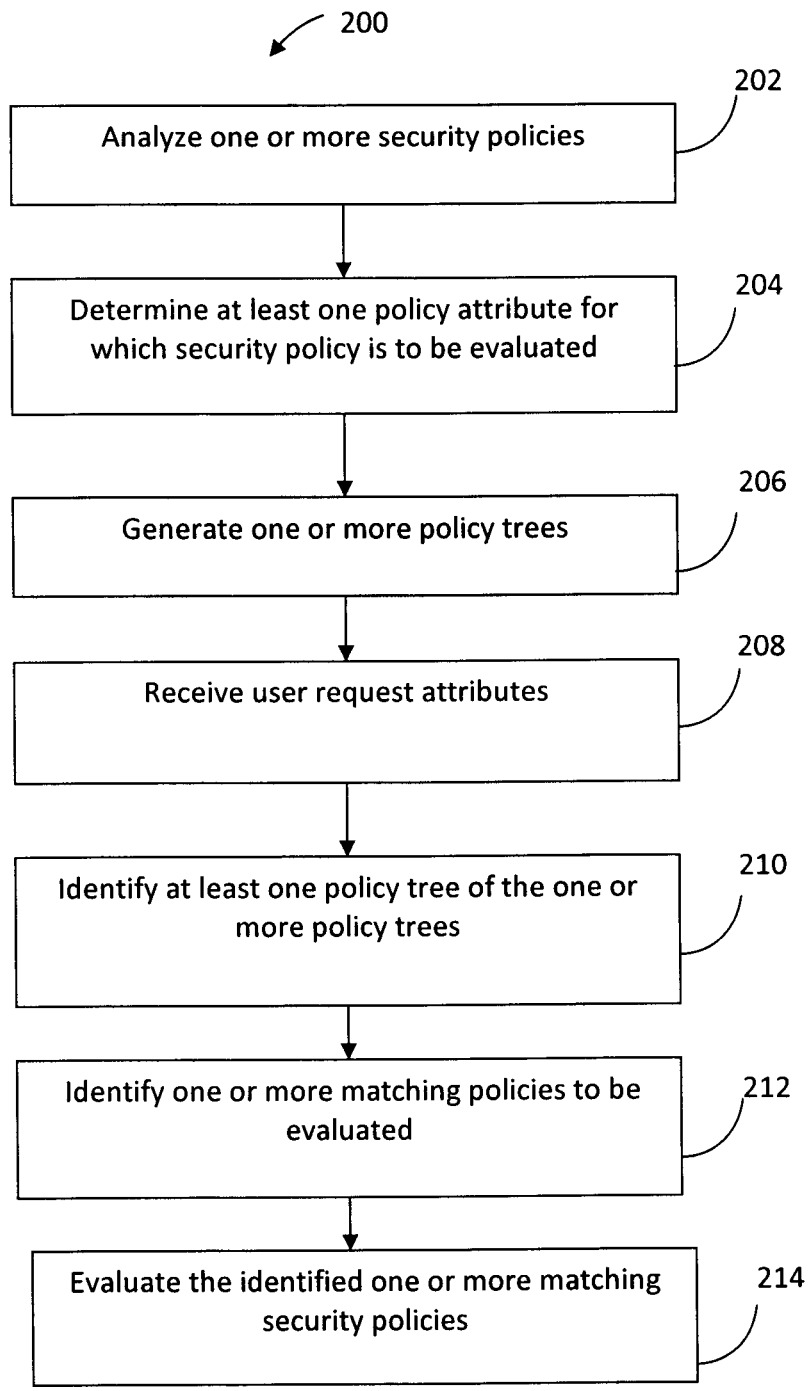

DYNAMIC POLICY TREES FOR MATCHING POLICIES

TECHNICAL FIELD

The invention relates to the field of security management systems and products. More particularly, the invention relates to managing policies for security management systems and products.

BACKGROUND

A security management system/product may manage user authentication (i.e., authenticating user identity) and may evaluate security policies based on attributes of a security policy to authorize users. An attribute may relate to an identity, a resource, an action, a rule, a response, or other information related to enforcing a security policy. For example, the security-based management system may verify an identity of a user based on an identity attribute of the security policy. The security-based management system may verify that an authenticated user may perform a particular action and/or may access particular resources (e.g., servers, devices, files, applications, domains, etc.) based on the action and the resource attribute of the security policy. As security management products are being used to protect an increasing number of applications, the number of policies for an application typically runs into hundreds, thousands, and sometimes millions of policies. The management of these policies becomes a cumbersome task and the performance of a policy evaluation engine used to evaluate the policies suffers as a result of the need to match and evaluate a large number of policies.

Different security policies may emphasize certain attributes over other attributes. For example, a resource-based security policy may be more concerned with identifying processes that may be performed using the resource rather than identifying users that may access a resource (such as when all users may access the resource). In this example, the resource attribute is more important than the identity attribute with respect to the resource-based security policy. Evaluating an identity attribute for this resource-based security policy would unnecessarily waste policy evaluation time and/or processing. On the other hand, an identity-based security policy may be more concerned with authenticating a user and determining roles of the user rather than determining what processes may be performed at particular resources. In this example, the identity attribute is more important for the identity-based policy and evaluating the identity-based security policy with a resource attribute would waste policy evaluation time and/or processing. Yet some conventional systems evaluate all policies irrespective of which attributes may be more important.

Other conventional systems may generate a policy tree to traverse the security policies based on an attribute in an attempt to reduce policy evaluation times. However, these systems fail to prioritize the generated policy tree. The result is that unnecessary processing continues to occur. For example, conventional systems may generate policy trees based on a single attribute such as a resource attribute, irrespective of whether the resource attribute is important for policy evaluation. However, this is not helpful when the security policies should be evaluated based on another attribute such as the identity attribute. In these instances, conventional systems parse through all the security policies in the policy tree until security policies for which the identity attribute is to be evaluated is found. This becomes time consuming, leading to increased policy evaluation times and delayed user request processing. Thus, conventional systems fail to efficiently match relevant security policies with attributes, resulting in unnecessary policy evaluations.

Thus, what is needed is an efficient way to identify or otherwise prioritize relevant security policies based on attributes for which policy evaluation should occur.

These and other drawbacks exist.

SUMMARY

In some implementations, the invention relates to a system and method for optimizing the evaluation of one or more security policies. Security policies may be analyzed to determine one or more attributes based on which one or more policy trees should be built. Different types of applications, domains, and/or systems, may rely on different attributes for their policy design. For example, one application may be based on identity attributes for its policy design whereas another application may be based on resource attributes for its policy design. In some implementations, policy tree(s) associated with different applications, domains, and/or systems, may be built (i.e., generated) and organized according to the attributes upon which these applications, domains, and/or systems rely. A policy evaluation engine may utilize these policy trees for evaluation purposes. By generating policy trees organized according to policy attributes important to security policies, relevant security policies may be quickly identified so that they are matched and/or evaluated before or instead of non-relevant security policies. In this manner, the security management system can reduce or eliminate unnecessary match and/or evaluation of security policies that are not relevant to a particular request.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

FIG. 2 illustrates a flowchart depicting example operations performed by a security management system, according to various aspects of the invention.

Figure 1:
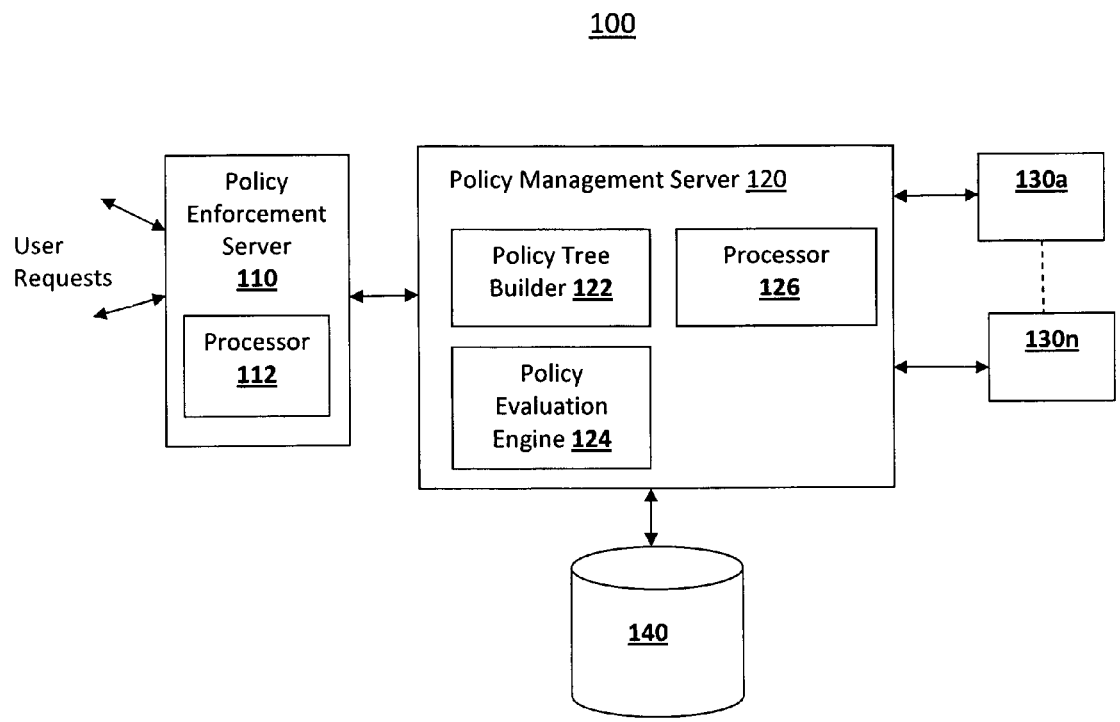
FIG. 1 illustrates an exemplary security management system, according to various aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

FIG. 1 is an exemplary illustration of a security management system 100 for an enterprise, according to an aspect of the invention. Security management system 100 may include, among other things, at least a policy enforcement server 110, a policy management server 120, and/or other components. In some implementations, policy enforcement server 110 is configured to intercept one or more user requests to access one or more resources and/or a network. In some implementations, policy enforcement server 110 may collect one or more user request attributes associated with each user request, including but not limited to, identity attributes (e.g. attributes describing the user requesting access), resource attributes (e.g., attributes describing the resource for which access is requested), action attributes (attributes describing the action that has been requested to be performed on or associated with the resource), and/or other attributes. Policy enforcement server 110 may provide these collected attributes to policy management server 120. Policy management server 120 may be configured to identify security policies that are to be evaluated based on the user request attributes and then perform policy evaluation on the identified security policies. For example, policy management server 120 may authenticate users on behalf of the policy enforcement server 110, make authorization decisions (e.g., grant access, deny access, etc.) that may be communicated back to the policy enforcement server 110, and/or perform other tasks related to security policy evaluation. Policy enforcement server 110 may enforce the authorization decisions made by the policy management server 120 and may, for example, communicate (to the user) whether or not access to the requested resource/network has been authorized.

Policy management server 120 may be communicatively coupled to a database 140 that may store/maintain one or more security policies. Policy management server 120 may make authorization decisions by evaluating the one or more security policies stored in a database 140. The one or more security policies may be defined/designed by one or more administrators. A security policy may protect resources by explicitly allowing or denying user access. The policy may specify: the resources that are protected; the users, groups or roles that have access to these resources; the actions that a user is allowed to perform on the resources; the conditions under which this access should be granted; and/or the delivery method of those resources to authorized users.

In some implementations, security policies may include one or more policy attributes and may be based on a 5-tuple of attributes. For example, the policy may be a function of Identity, Resource, Action, Rule, and Response attributes. The identity attribute may specify identities of one or more users based on one or more identity attributes (e.g., name, role, age, department, etc.). The resource attribute may specify one or more system and/or network resources based on one or more resource attributes (e.g., resource name, resource id, etc.). The action attribute may specify one or more actions that can be performed (e.g., update, create, delete, view, modify, etc.). The rules attribute may grant or deny access to a specific resource or resources that are included within the policy. A rule may describe the resource being protected, whether it is an entire application, a portion of an application, or a specific component of the application. The response attribute may be configurable actions that result from the processing of a policy. Responses may deliver user profile data and entitlements to an application resource (for example) when access is granted. With this information, the application may present a personalized interface and determine which capabilities to offer the user. Responses may also be used to tailor what the user sees when access is denied or the user's session times out. Although described as a 5-tuple, the foregoing example is non-limiting. For example, any number and/or combination of attributes may be used as would be appreciated.

Administrators (or other users) may interact with the policy management server 120 via one or more client devices 130*a*, . . . , 130*n*. Client devices 130*a*, . . . , 130*n* may each comprise a user interface (not otherwise illustrated in FIG. 1) that may enable users to perform various operations that may facilitate interaction with policy management server 120 including, for example, designing policies, viewing policies, editing policies and/or policy trees, and/or performing other operations. Client devices 130*a*, . . . , 130*n* may include a processor (not otherwise illustrated in FIG. 1), circuitry, and/or other hardware operable to execute computer-readable instructions.

Policy enforcement server 110 may include a processor 112, circuitry and/or other hardware operable to execute computer-readable instructions. Policy management server 120 may include a processor 126, circuitry and/or other hardware operable to execute computer-readable instructions. According to one aspect of the invention, security management system 100 may include one or more tangible computer-readable storage media configured to store one or more software modules, wherein the software modules include computer-readable instructions that when executed by one or more processors 112, 126 cause the one or more processors 112, 126 to perform the functions described herein. According to one implementation, policy management server 120 may comprise computer hardware programmed with a computer application having one or more software modules that enable the various features and functions of the invention. Non-limiting examples of the software modules in the application may include one or more of a policy tree builder 122, a policy evaluation engine 124, and/or other modules for performing the features and functions described herein.

Policy evaluation engine 124 may receive one or more user request attributes, including but not limited to, identity attributes (e.g. attributes describing the user requesting access), resource attributes (e.g., attributes describing the resource for which access is requested), action attributes (attributes describing the action that has been requested to be performed on or associated with the resource), and/or other attribute, from policy enforcement server 110. Policy evaluation engine 124 may analyze the received attributes, and perform a match based on the security policies in database 140 to determine a set of security policies that are to be evaluated. In other words, policy evaluation engine 124 may parse through the security policies in database 140 to identify a set of policies whose policy attributes (e.g., from the 5-tuple mentioned above) match the user request attributes received from the policy enforcement server 110. Policy evaluation engine 124 may evaluate each of the policies in the matching policy set using the rules defined in each policy and may send back a response identified in each policy to the policy enforcement server 110.

In some implementations, policy tree builder 122 may build and/or organize one or more policy trees based on one or more policy attributes. In some implementations, the one or more policy attributes include the policy 5-tuple mentioned above. The one or more policy trees may be binary trees, suffix-based trees, or any other tree-based structures.

In one implementation, policy tree builder 122 may analyze the nature of the one or more policies in the database 140 and may build/organize one or more policy trees based on one or more policy attributes. In other words, policy tree builder 122 may organize policy trees based on policy attributes that are important for each security policy. For example, policy tree builder 122 may determine at least one policy attribute for which the security policy is to be evaluated. In other words, the determined at least one policy attribute includes a policy attribute for which the security policy emphasizes. In this manner, policy tree builder 122 may determine at least one policy attribute that is used when evaluating each security policy so that each security policy is indexed according to the important policy attribute or attributes. Thus, efficient identification of security policies based on policy attributes that are important for each security policy may be achieved.

In some implementations, policy tree builder 122 may generate and/or update the one or more policy trees organized according to at least one policy attribute when security management system 100 comes online (i.e., is booted up), when new security policies are added, when existing security policies are updated, and/or at other appropriate time so that current policy trees are available for evaluation of security policies when a request is received.

In some implementations, policy tree builder 122 may generate one or more policy trees that each include at least one of the one or more security policies, where the one or more policy trees are each organized according to the determined at least one policy attribute of the at least one of the one or more security policies. In other words, policy tree builder 122 may generate one or more policy trees that include security policies. The policy trees may be organized according to the policy attributes that were determined to be important for each security policy. For example, a policy tree may be organized according to a resource attribute so that security policies for which the resource attribute is important are prioritized. In this manner, a request to access or otherwise interface with system 100 may be associated with a particular resource and evaluated against policy trees organized according to the resource attribute rather than policy trees organized according to an identity attribute. Thus, the request may be evaluated according to relevant security policies rather than security policies that may not be relevant to the request.

In some implementations, policy tree builder 122 may analyze the security policies and may score the policies based on the one or more policy attributes of the 5-tuple and/or other policy attributes based on the analysis. In one implementation, scoring the policies may comprise assigning a score for or otherwise based on the one or more policy attributes.

In some implementations, the scores may be numeric, alphanumeric, text, and/or other format suitable to convey scoring information. For example, a first security policy may receive a high resource attribute score but receive a low identity attribute score. A second security policy may receive a low resource attribute score but receive a high identity attribute score. In these non-limiting examples, the first security policy may be determined to be a resource-based security policy while the second security policy may be determined to be an identity-based security policy. In this manner, the first and second security policies may be efficiently identified when processing a request. For example, a request to cause a process to occur at a particular resource may cause an evaluation of the first (resource-based) security policy over the second (identity-based) security policy. A request to authenticate an identity and/or role of a user may cause an evaluation of the second (identity-based) security policy over the first (resource-based) security policy. Thus, based on the request and the scores, an appropriate security policy or set of security policies may be identified and evaluated.

In some implementations, security policies may be placed on policy trees according to attribute scores of the security policies. For example, a security policy having a high resource attribute-score may be placed in a policy tree organized according to the resource attribute. In this manner, different security policies may be prioritized according to their scores, which indicate important policy attributes for the different security policies.

In some implementations, the scores may include "buckets" or bins for each policy attribute after a determination of which policy attribute is important for each security policy. For example, security policies (and/or policy trees) may be placed in a resource attribute bin, an identity bin, and/or other policy attribute bin. When a request is received, the appropriate attribute bin may be identified so that the appropriate security policies and/or policy trees may be evaluated.

For example, a job scheduling system/application may have policies that are oriented towards resource attributes (for example, resource name, resource type, resource group, etc.). Examples of policies that are oriented towards resource attributes may include, but not be limited to: i) If ResourceAttribute[Machine.Type] NOT=Server AND Action="Desktop Update" then Allow Access; ii) If ResourceAttribute[Machine.Group]=Email Server and Action="Email Client Update", then Deny Access; etc. In this case, the job scheduling system has policies based on the machine name as the resource on which the policies are based. As such, the resource name attribute may be scored higher than the identity attributes. Thus, policy tree builder 122 may build the policy tree for the job scheduling system based on the resource attribute.

On the other hand, a financial accounts system/application may have policies that are oriented towards identity attributes. For example, a financial accounts system at a large bank may have delegation policies oriented towards identity attributes. A scenario would be that a father and a mother have accounts at the bank with the father being the primary owner, and the mother and the children being secondary owners. The father may delegate the management of some of the family accounts to the mother. This delegation policy would depend on attributes associated with the identity (i.e., identity attribute of the person that specifies that this person's role is a mother or a child and the household ID is the same as the delegator). Examples of policies that are oriented towards identity attributes may include, but not be limited to: i) If Identity.Role="administrator" then allow access (indicating that administrators can access all resources); ii) If Identity.HouseHoldId="Smith" and Identity.Role=Mother and Account.Number="112233" then Allow access (indicating that for the smith family, the mother can access the father's accounts with number 112233); iii) If Identity.Role="representative" and Action="view or modify" then Allow Access (indicating that customer representatives can only view and modify accounts); etc. In this case, policy tree builder 122 may determine that the largest number of policies for this system are serviced by identity attributes. Thus, the identity attributes may be scored higher than the resource attributes. As such, policy tree builder 122 may build the policy tree for the financial accounts system based on the identity attributes. For instance, for the three example policies oriented towards identity attributes described above, policy tree builder 122 may analyze the policies and assign a score to each attribute (resource, identity, etc.) each time the attribute occurs in the policy. After the first policy is analyzed, the assigned scores would be Identity.Role=1, Identity.HouseHoldId=0, Account.Number=0. After the second policy is analyzed, the assigned scores would be Identity. Role=2, Identity.HouseHoldId=1, Account.Number=1. After the third policy is analyzed, the assigned scores would be Identity.Role=3, Identity.HouseHoldId=1, Account.Number=1. Thus, policy tree builder 122 may build the policy tree for the exemplary financial accounts system based on the Identity.Role attribute that has the highest score so that each node of the policy tree points to a Role value and the policies associated with that role. When a user request is received, a determination may be made that the policy tree that is organized according to the Identity.Role attribute should be used for evaluation. Accordingly, the user request attributes (for example, the role attribute) may be matched with the security policies associated with the determined policy tree to identify one or more matching policies that should be evaluated. For example, a node corresponding to the role attribute (exemplary user request attribute) may be identified on the policy tree and the list of policies that have that role are matched and evaluated. It will be understood that any type of scoring system for scoring policies may be utilized without departing from the scope of the system. Policy tree builder 122 may build the trees at design time or before evaluation is to be performed.

Policy tree builder 122 may analyze one or more policies associated with an application, a domain, a system, etc. Based on the analysis, policy tree builder 122 may determine one or more policy attributes (of the 5-tuple and/or other policy attributes) based on which one or more policy trees are to be built. For example, for an HR application, it may be determined that one or more policy trees should be built based on identity and action attributes because most of the policies associated with the HR application are serviced by these attributes. Similarly, for different applications, domains, system, etc., different attributes may be chosen based on which policy trees should be built. Policy tree builder 122 may store the policy trees in database 140.

Policy evaluation engine 124 may receive user request attributes associated with a user request. Policy evaluation engine 124 may determine the type of user request based on the user request attributes. Based on the type of request (i.e., the user request attributes), policy evaluation engine 124 may determine one or more policy trees that should be used for evaluation. For example, in response to a determination that the request is for access to an HR application/resource, a determination may be made that the policy trees that are organized based on the identity and/or action attributes should be used for evaluation. Policy evaluation engine 124 may match user request attributes with the determined policy trees to identify one or more matching policies that should be evaluated. As such, policy evaluation engine 124 performs the matching process for a smaller set of policies associated with the determined policy trees without having to look through all policies in database 140. Policy evaluation engine 124 may then evaluate the set of matching policies.

FIG. 2 is a flowchart depicting example operations performed by a security management system 100 to evaluate one or more security policies, according to various aspects of the invention. In some implementations, the example operations may be performed by one or more modules/components associated with the security management system 100. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described are exemplary in nature and, as such, should not be viewed as limiting.

In operation 202, one or more security policies may be analyzed, by policy tree builder 122, for example. In operation 204, for each of the one or more security policies, at least one policy attribute for which the security policy is to be evaluated may be determined based on the analysis. In operation 206, one or more policy trees may be generated. Each generated policy tree may include at least one of the one or more security policies, where the policy trees may each be organized according to the determined at least one policy attribute of the at least one of the one or more security policies. For example, security policies for an HR application/domain/system may be analyzed. Based on the analysis, the at least one policy attribute for which security policies associated with the HR application is to be evaluated may determined, where the at least one policy attribute may include identity and/or action attributes. The one or more policy trees may be generated and/or organized based on identity and/or action attributes.

In operation 208, a user request may be received, wherein the user request may include one or more request attributes. The user request may be a request to access a resource and/or a network. In some implementations, the type of the user request may be determined based on the one or more request attributes. Based on the attributes, a determination may be made regarding the application, domain, and/or system that a user is requesting access to. For example, based on the resource attribute, a determination may be made that the user is requesting access to a HR application/domain/system, thereby indicating that the user request is an HR type request.

In operation 210, at least one policy tree of the one or more policy trees may be identified to be used for evaluation based on the at least one policy attribute and/or the one or more request attributes. In some implementations, at least one policy tree to be used for evaluation may be identified based on the type of user request (i.e., request attributes). For example, in response to a determination that the user request is an HR type request (i.e., requests access to a HR application/domain/system), a determination may be made that policy trees associated with the HR application/domain/system should be used for evaluation. In other words, it may be determined that the policy trees that are organized based on the identity and/or action attributes should be used for evaluation.

In some implementations, one or more security policies may be evaluated based on the identified at least one policy tree. In operation 212, one or more matching policies that need to be evaluated may be identified. In some implementations, the user request attributes may be matched to one or more security policies associated with the identified at least one policy tree to identify one or more matching policies that should be evaluated. In operation 214, the one or more matching policies may then be evaluated. The matching policies may be evaluated based on one or more rules associated with the policies.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for evaluating security policies, the method executed by one or more hardware processors configured to perform a plurality of operations, the operations comprising:

determining a policy attribute for each of a plurality of security policies;

generating a first policy tree that comprises one or more first security policies from among the plurality of security policies, wherein each security policy of the one or more first security policies emphasizes a first policy attribute over a second policy attribute, and wherein the first policy tree is organized according to the first policy attribute corresponding to each security policy of the one or more first security policies and based on the determining;

generating a second policy tree that comprises one or more second security policies from among the plurality of security policies, wherein each security policy of the one or more second security policies emphasizes the second policy attribute over the first policy attribute, wherein the second policy tree is organized according to the second policy attribute corresponding to each security policy of the one or more second security policies and based on the determining, and wherein the second policy attribute is different than the first policy attribute;

receiving a request attribute associated with a request to access a resource or network;

determining whether the first policy tree or the second policy tree is to be used to evaluate the request to access the resource or the network based on the request attribute, the first policy attribute and the second policy attribute; and in response to the determining, evaluating the one or more first security policies associated with the first policy tree when the first policy tree is to be used to evaluate the request to access the resource or the network, and evaluating the one or more second security policies associated with the second policy tree when the second policy tree is to be used to evaluate the request to access the resource or the network.

2. The computer-implemented method of claim 1, the operations further comprising:

scoring each of the plurality of security policies based on the determined policy attribute, wherein said scoring comprises assigning a score based on the determined policy attribute, wherein said assigning further comprises:

assigning a first attribute score to the first policy attribute, and assigning a second attribute score to the second policy attribute, wherein the first attribute score is higher relative to the second attribute score for the one or more first security policies, and wherein the second attribute score is higher relative to the first attribute score for the one or more second security policies;

placing the one or more first security policies in the first policy tree organized according to the first policy attribute based on the first attribute score; and placing the one or more second security policies in the second policy tree organized according to the second policy attribute based on the second attribute score.

3. The computer-implemented method of claim 1, the operations further comprising:

matching the request attribute with the one or more first security policies when the first policy tree is to be used to evaluate the request to access the resource or the network, and matching the request attribute with the one or more second security policies when the second policy tree is to be used to evaluate the request to access the resource or the network;

identifying a matching policy to be evaluated based on the match; and evaluating the matching policy based on one or more rules.

4. The computer-implemented method of claim 1, the operations further comprising:

determining a type of the request based on the request attribute, wherein determining the type of the request further comprises determining an application for which access is requested.

5. The computer-implemented method of claim 4, wherein the first policy tree is generated for a first application based on the first policy attribute and wherein the second policy tree is generated for a second application based on the second policy attribute, and wherein said determining whether the first policy tree or the second policy tree is to be used to evaluate the request further comprising:

determining whether the first policy tree or the second policy tree is to be used to evaluate the request based on the determined application for which access is requested, wherein the first policy tree is determined to be used to evaluate the request in response to a determination that access is requested for the first application, and wherein the second policy tree is determined to be used to evaluate the request in response to a determination that access is requested for the second application.

6. A non-transitory computer-readable storage medium having one or more computer-readable instructions thereon which when executed by one or more hardware processors cause the one or more hardware processors to:

determine a policy attribute for each of a plurality of security policies;

generate a first policy tree that comprises one or more first security policies from among the plurality of security policies, wherein each security policy of the one or more first security policies emphasizes a first policy attribute over a second policy attribute, and wherein the first policy tree is organized according to the first policy attribute corresponding to each security policy of the one or more first security policies and based on the determining;

generate a second policy tree that comprises one or more second security policies from among the plurality of security policies, wherein each security policy of the one or more second security policies emphasizes the second policy attribute over the first policy attribute, wherein the second policy tree is organized according to the second policy attribute corresponding to each security policy of the one or more second security policies and based on the determining, and wherein the second policy attribute is different than the first policy attribute;

receive a request attribute associated with a request to access a resource or network;

determine whether the first policy tree or the second policy tree is to be used to evaluate the request to access the resource or the network based on the request attribute, the first policy attribute and the second policy attribute; and in response to said determining, evaluate the one or more first security policies associated with the first policy tree when the first policy tree is to be used to evaluate the request to access the resource or the network, and evaluating the one or more second security policies associated with the second policy tree when the second policy tree is to be used to evaluate the request to access the resource or the network.

7. The non-transitory computer-readable storage medium of claim 6, wherein the one or more instructions further cause the one or more hardware processors to:
score each of the plurality of security policies based on the determined policy attribute, wherein said scoring comprises assigning a score based on the determined policy attribute, wherein said instructions causing the hardware processors to assign a score are further cause the hardware processors to:
assign a first attribute score to the first policy attribute, and
assign a second attribute score to the second policy attribute, wherein the first attribute score is higher relative to the second attribute score for the one or more first security policies, and wherein the second attribute score is higher relative to the first attribute score for the one or more second security policies;
place the one or more first security policies in the first policy tree organized according to the first policy attribute based on the first attribute score; and
place the one or more second security policies in the second policy tree organized according to the second policy attribute based on the second attribute score.

8. The non-transitory computer-readable storage medium of claim 6, wherein the one or more instructions further cause the one or more hardware processors to:
match the request attribute with the one or more first security policies when the first policy tree is to be used to evaluate the request to access the resource or the network, and match the request attribute with the one or more second security policies when the second policy tree is to be used to evaluate the request to access the resource or the network;
identify a matching policy to be evaluated based on the match; and
evaluate the matching policy based on one or more rules.

9. The non-transitory computer-readable storage medium of claim 6, wherein the one or more instructions further cause the one or more hardware processors to:
determine a type of the request based on the request attribute, wherein determining the type of the request further comprises determining an application for which access is requested.

10. The non-transitory computer-readable storage medium of claim 9, wherein the first policy tree is generated for a first application based on the first policy attribute and wherein the second policy tree is generated for a second application based on the second policy attribute, and wherein the one or more computer-readable instructions causing the one or more hardware processors to determine whether the first policy tree or the second policy tree is to be used to evaluate the request further include instructions causing the one or more hardware processors to:
determine whether the first policy tree or the second policy tree is to be used to evaluate the request based on the determined application for which access is requested, wherein the first policy tree is determined to be used to evaluate the request in response to a determination that access is requested for the first application, and wherein the second policy tree is determined to be used to evaluate the request in response to a determination that access is requested for the second application.

11. A computer-implemented system for evaluating one or more security policies, the system comprising:
a server comprising one or more hardware processors configured to:
determine a policy attribute for each of a plurality of security policies;
generate a first policy tree that comprises one or more first security policies from among the plurality of security policies, wherein each security policy of the one or more first security policies emphasizes a first policy attribute over a second policy attribute, and wherein the first policy tree is organized according to the first policy attribute corresponding to each security policy of the one or more first security policies and based on the determining;
generate a second policy tree that comprises one or more second security policies from among the plurality of security policies, wherein each security policy of the one or more second security policies emphasizes the second policy attribute over the first policy attribute, wherein the second policy tree is organized according to the second policy attribute corresponding to each security policy of the one or more second security policies and based on the determining, and wherein the second policy attribute is different than the first policy attribute;
receive a request attribute associated with a request to access a resource or network;
determine whether the first policy tree or the second policy tree is to be used to evaluate the request to access the resource or the network based on the request attribute, the first policy attribute and the second policy attribute; and
in response to said determining, evaluate the one or more first security policies associated with the first policy tree when the first policy tree is to be used to evaluate the request to access the resource or the network, and evaluating the one or more second security policies associated with the second policy tree when the second policy tree is to be used to evaluate the request to access the resource or the network.

12. The computer-implemented system of claim 11, wherein the one or more hardware processors are further configured to:
score each security policy based on the determined policy attribute, wherein said scoring comprises assigning a score based on the determined policy attribute, wherein the hardware processors configured to assign a score are further configured to:
assign a first attribute score to the first policy attribute, and
assign a second attribute score to the second policy attribute, wherein the first attribute score is higher relative to the second attribute score for the one or more first security policies, and wherein the second attribute score is higher relative to the first attribute score for the one or more second security policies;
place the one or more first security policies in the first policy tree organized according to the first policy attribute based on the first attribute score; and
place the one or more second security policies in the second policy tree organized according to the second policy attribute based on the second attribute score.

13. The computer-implemented system of claim 11, wherein the one or more hardware processors are further configured to:
match the request attribute with the one or more first security policies when the first policy tree is to be used to evaluate the request to access the resource or the network, and match the request attribute with the one or more second security policies when the second policy tree is to be used to evaluate the request to access the resource or the network;

identify a matching policy to be evaluated based on the match; and evaluate the matching policy based on one or more rules.

14. The computer-implemented system of claim 11, wherein the one or more hardware processors are further configured to:

determine a type of the request based on the request attribute, wherein determining the type of the request further comprises determining an application for which access is requested.

15. The computer-implemented system of claim 11, wherein the first policy tree is generated for a first application based on the first policy attribute and wherein the second policy tree is generated for a second application based on the second policy attribute, and wherein the one or more hardware processors configured to determine whether the first policy tree or the second policy tree is to be used to evaluate the request further comprise one or more hardware processors configured to:

determine whether the first policy tree or the second policy tree is to be used to evaluate the request based on the determined application for which access is requested, wherein the first policy tree is determined to be used to evaluate the request in response to a determination that access is requested for the first application, and wherein the second policy tree is determined to be used to evaluate the request in response to a determination that access is requested for the second application.

* * * * *